June 19, 1962    F. C. MESERVE    3,039,520
TIRE SLITTING OR SIPING MACHINE
Filed April 14, 1960

INVENTOR.
F. Clayton Meserve
BY
Kenway, Jenney, Witter & Hildreth
Attys.

# United States Patent Office 3,039,520
Patented June 19, 1962

3,039,520
TIRE SLITTING OR SIPING MACHINE
Forrest Clayton Meserve, North Andover, Mass., assignor to Micro Machinery Products, Inc., Winchester, Mass., a corporation of Massachusetts
Filed Apr. 14, 1960, Ser. No. 22,297
1 Claim. (Cl. 157—13)

This invention relates to tire slitting or siping machines of the type employing a rotary drum having tire feeding helical threads and a projecting helical blade of the type disclosed in United States Letters Patent No. 2,741,307, April 10, 1956. In operating such machines the tire upon its rim and wheel is rotatably mounted as a unit upon a transverse shaft above the drum and this entails heavy lifting work upon the operator, in disengaging and removing the siped tire and also in presenting the tire to the drum so that the tread of the tire will be properly embedded in the threads of the drum.

The present invention comprises new and improved power-operated mechanism for forcibly presenting the tire to the drum preparatory to the siping operation and for removing the siped tire from the drum for convenient removal from the machine.

These and other features of the invention will be best understood and appreciated from the following description of a preferred embodiment thereof selected for purposes of illustration and shown in the accompanying drawings in which—

The invention is herein shown as embodied in the well-known machinery marketed under the trademark "Micro-Siper" Registration No. 617,808 and described in Patent No. 2,741,307 and Patent No. 2,863,507 to which reference may be had for details of construction not fully shown herein.

Figure 1:
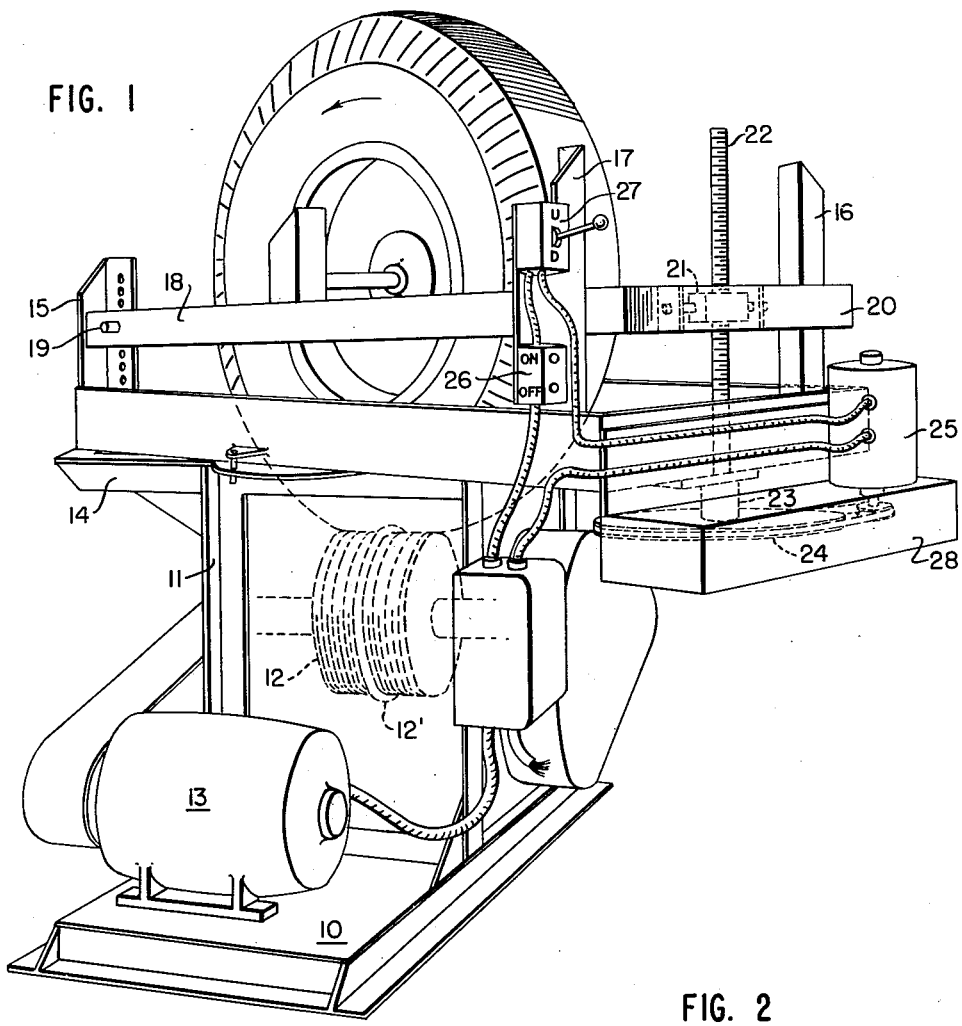
FIG. 1 is a view in perspective of the complete machine.
Figure 2:
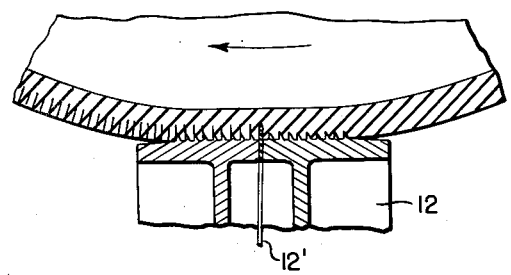
FIG. 2 is a fragmentary view showing a portion of a tire in operative relation to the drum.

As shown in FIG. 1, the machine comprises a base 10 from which rises an upright frame 11. In this frame is journaled a rotary drum 12 having a tire-feeding helical thread which projects from its cylindrical surface for indenting but not cutting the tire and a helical blade 12' which projects beyond the thread of the drum by an amount equal to the depth of the desired siping cut. The drum is driven by a motor 13 on the base 10 through suitable transmission gearing. The frame 11 carries a stationary horizontal table 14 on which rests a movable carrier having upright posts at its corners of which those marked 15, 16 and 17 are shown in FIG. 1. The tire to be siped is rotatably mounted between the forks of a yoke 18, the free ends of which are adjustably and pivotally conected by pins 19 to the upright post 15 and the corresponding post at the far corner of the movable carrier. The closed end section 20 of the yoke is provided with a pivotally supported nut 21 through which passes a vertical screw 22. The screw 22 is mounted in bearings 23 secured to the bottom of the carrier which rests on the table 14 and provided with a large driven pulley 24. A rectangular box-shaped bracket 28 is secured to the right hand end of the carrier and encloses the pulley 24. Mounted upon the bracket 28 is a vertical reversible motor 25 having a small driving pulley connected by an endless V belt to the pulley 24 of the screw 22. The belting connections between the motor 25 and the screw 22 are located within the enclosure of the bracket 28.

The electrical connections to the motor 13 include a starting and stopping switch 26 which is secured in convenient position to the upright post 17. The electrical connections to the motor 25 include a reversing switch 27 also mounted on the post 17. The operating handle of the reversing switch 27 is biased to stand normally in its off position as shown in FIG. 1. When the handle is moved up, the motor 25 is operated in the direction to rotate the screw 22 and lift the yoke 20 with the tire therein away from the drum and to an inoperative position from which it can be removed from the machine. This upward oscillation of the yoke stops immediately when the operator releases the handle of the reversing switch 27.

After a fresh tire has been mounted in the yoke 18, the operator depresses the handle of the reversing switch whereupon the motor 25 is operated in the proper direction to cause the screw 22 to lower the yoke forcibly embedding the tread of the tire in the threads of the drum 12 preparatory to the siping operation. Action of the motor 25 in this direction is utilized also to cause more or less conformation of the tire to the curvature of the drum 12 and so govern the location of the siping cuts with respect to the sides of the tire tread. Rotation of the motor 25 may be continued until the sides of the tread are forced down substantially into the path of the blade 12' and so are also slitted to some extent. The nut 21 and screw 22 hold in whatever point is determined by the action of the motor under control of the switch 27.

In the siping operation the tire is rotated uniformly and continuously as by worm and wheel action of the indenting threads of the drum until the complete circumference of the tire has been siped. The entire series of steps of transverse slits is made under a single setting of the yoke 18.

The two motors are independently controlled by their respective switches, and the motor 13 is usually not started until the tire has been pressed against the drum 12 and the motor 25 shut off.

It will be understood that the carrier of the posts 15, 16, 17 and the yoke 20 in which the tire is rotatably mounted is itself arranged for angular adjustment in a horizontal plane upon the table 14 about a vertical axis passing through the drum 12. This adjustment feature as explained in my prior Patent 2,863,507 determines the transverse angle of the siping cuts made by the helical blade in the tire.

Having thus disclosed my invention and described in detail an illustrative embodiment thereof, I claim as new and desire to secure by Letters Patent:

In a tire slitting or siping machine having a stationary frame, a rotary drum mounted therein and presenting tire-feeding helical threads and a projecting helical blade; a wheel and tire assembly carrier angularly movable on the frame above the drum and about a vertical axis, a yoke pivotally mounted on the carrier for movement therewith and also for swinging movement toward and from the drum beneath it, an upright screw projecting from the movable carrier and having pivoted and threaded connection with the yoke at the free end thereof, a box-shaped bracket fast upon said movable carrier, a reversible motor mounted upon the bracket and belt connections enclosed within the bracket and leading from the motor to the lower end of said screw, together with a reversing switch for the motor located adjacent to one end of the yoke.

References Cited in the file of this patent
UNITED STATES PATENTS

| | | |
|---|---|---|
| 142,749 | Thralls | Sept. 9, 1873 |
| 291,823 | Wickes | Jan. 8, 1884 |
| 2,142,303 | Crouch | Jan. 3, 1939 |
| 2,741,307 | Meserve et al. | Apr. 10, 1956 |
| 2,863,507 | Meserve et al. | Dec. 9, 1958 |
| 2,918,116 | Mooney | Dec. 22, 1959 |